United States Patent Office 3,827,992
Patented Aug. 6, 1974

3,827,992
ADDITIVE FOR CEMENT BASED MORTARS
Alois Aignesberger and Hans-Gunter Rosenbauer, Trostberg, Germany, assignors to Suddeutsche Kalkstickstoff-Werke Aktiengesellschaft, Trostberg, Germany
No Drawing. Continuation-in-part of abandoned application Ser. No. 181,618, Sept. 17, 1971. This application Apr. 4, 1973, Ser. No. 347,894
Claims priority, application Great Britain, Aug. 10, 1971, 37,509/71; Japan, Oct. 5, 1971, 46/77,593; Sweden, Aug. 27, 1971, 10,855/71; Australia, Nov. 16, 1971, 35,746/71
Int. Cl. C08g 9/04
U.S. Cl. 260—21                    5 Claims

ABSTRACT OF THE DISCLOSURE

An additve consisting essentially of a mixture of a sulfonic acid group-containing melamine formaldehyde condensation product and a metal stearate is capable of strengthening and water-proofing cement products.

---

This application is a continuation-in-part of Ser. No. 181,618 filed Stp. 17, 1971, and now abandoned.

This invention relates to an additive for cement-based mortars useful in the production of water-impervious concrete products.

In the manufacture of water-proof cement products, and particularly in the manufacture of cement-based ceiling, wall and floor finishes, it has already been suggested, e.g., in Austrian Patent 192,838, to add to the cement mix water-soluble sealing agents based on alkali metal silicates, alkali metal aluminates, $Fe(OH)_3$, fats, fatty acids, etc.

Sealants and adhesion agents as additives for cement or cement-containing mortars which consist of alkali metal fatty soaps, alkali metal resin soaps, NaOH and glycerine, as well as $AlCl_3/NaOH$ and $KOH/NaOH/CaCl_2$, have been described in Swiss Pat. 372,967 as well as in West German Provisional Pat. 1,057,002.

The known sealing agents, however, have an unfavorable effect on the strength of the concrete or cement products.

It has been found that additives consisting essentially of 50–96% by weight, preferably 50–80% by weight of melamine formaldehyde condensation products which contain sulfonic acid groups and have a viscosity of 5–300 cp., measured in aqueous solution of 20% solids content, and 50–4% by weight, preferably 50–20% by weight metal stearate, which in addition may contain other known sealing agents, do not have this disadvantage. Surprisingly the additive of the invention exhibits both a strength-increasing (Examples 1 and 2) and reinforced hydrophobic (Example 3) action on the products of cement-based mortars. A synergistic effect is noted in that the known strength-increasing effect on building materials of melamine formaldehyde condensation products containing sulfonic acid groups is further increased by the presence of stearates known as sealing agents, while at the same time the known water-repelling activity of the stearates added in likewise improved.

The said melamine formaldehyde condensation products are available on the market. Their preparation is described in Austrian Pat. 263,607.

The metal stearates that are preferred in accordance with the invention include alkaline-earth metal stearates, zinc stearates, aluminum stearate and copper stearate.

Up to 50% by weight of the content of metal stearate can be replaced by an aluminate, preferably an alkali-metal aluminate such as potassium aluminate.

The additive of the invention must be added to the cement-based mortar mixes during the mixing process to assure uniform distribution into the mixture of building material. Therefore, one operation is saved as compared with sealing agents which are applied subsequently to the finished products.

The additives of the invention are useful for addition to Portland cement, dry batched aggregates and ready made mortars and are particularly suitable to addition to gun-applied concretes and floor toppings. The composition of these concretes and toppings is according to the level of technical art.

COMPARATIVE EXAMPLE

Standard prisms having a slump factor of 18±1 cm. were produced with commercial Portland cement 275 (a Portland cement which reaches a minimum compressive strength of 275 kg./cm.² under the conditions specified in DIN 1164 E, 1967). A sealing agent A, i.e., a commercial potassium aluminate-calcium stearate sealing agent composed of

|  | Parts by weight |
|---|---|
| Calcium stearate | 2.2 |
| Potassium aluminate | 1.5 |
| Calcium hydroxide | 1.6 |
| Potassium hydroxide | 6.3 |
| Sodium hydroxide | 1.2 |
| Water | 87.2 | was included in some of the prisms. After one day the prisms were removed from their molds, some were tested immediately, and the remainder were stored in a standard atmosphere at 20° C. and 65% relative humidity for later testing.

The results are tabulated immediately below:

| Sealing agent A (percent) referred to cement | Water/cement factor | Flexural tensile strength (kg./cm.²) after— | | Compressive strength (kg./cm.²) after— | |
|---|---|---|---|---|---|
|  |  | 24 hours | 28 days | 24 hours | 28 days |
| 0 | 0.51 | 15 | 40 | 54 | 194 |
| 10 | 0.49 | 19 | 45 | 65 | 178 |
| 20 | 0.52 | 20 | 47 | 63 | 138 |

EXAMPLE 1

Standard prisms having a slump factor of 18±1 cm. were produced with commercial Portland cement 275 in accordance with DIN 1164 E (1967 version), some with and some without additives. After a day the prisms were removed from their molds, some were tested immediately and the remainder were stored in a standard atmosphere at 20° C. and 65% relative humidity for later testing.

Additive B was a melamine-formaldehyde condensation product, available on the market as Melment L10 or F10, which contains sulfonic acid groups and has a viscosity of 10 cp., measured in an aqueous solution containing 20% by weight solid resin. Additive A was the sealing agent A described in the comparative example.

The results were:

| Additive, in percent by weight, referred to cement | | Water/cement factor | Flexural tensile strength (kg./cm.²) after— | | Compressive strength (kg./cm.²) after— | |
|---|---|---|---|---|---|---|
| A | B |  | 24 hours | 28 days | 24 hours | 28 days |
|  |  | 0.51 | 15 | 40 | 54 | 198 |
|  | 5 | 0.46 | 30 | 67 | 140 | 376 |
| 10 | 5 | 0.45 | 44 | 86 | 154 | 448 |
| 20 | 5 | 0.50 | 44 | 67 | 142 | 331 |

EXAMPLE 2

Pairs of sandlime or calcium silicate brick cubes having an edge length of 4 cm. were bonded together with cement pastes prepared to have a water-cement value of 0.37 and, as indicated in the table below, one or more additives. After 24 hours the shear strength was determined at the bonded surfaces.

Additive C is a melamine-formaldehyde condensation product containing sulfonic acid groups and having a viscosity of 96 cp. (Measured at 20° C. with the Brookfield rotary viscosimeter, Model HAT, Spindle No. 1, 20 r.p.m.) This resin is available on the market under the name Melment L 300 or F 300, and contains 20% by weight solid resin.

The results were:

| Additive, in percent by weight, referred to cement | | Shear strength (kg./cm.²) after 1 day |
|---|---|---|
| C | Commercial zinc stearate | |
| | | 0.7 |
| | 0.2 | 0.9 |
| | 0.4 | 0.7 |
| 10 | | 5.4 |
| 10 | 0.2 | 5.4 |
| 10 | 0.4 | 4.9 |
| 20 | | 7.1 |
| 20 | 0.2 | 7.8 |
| 20 | 0.4 | 6.8 |

EXAMPLE 3

Hydrophobic activity was tested by preparing, in accordance with DIN 1164 E (1967 version), standard prisms in a manner similar to Example 1 from Portland cement 275, standard sand, neutral zinc stearate and Additive B of Example 1 and thereupon measuring the water absorption in terms of X: the number of seconds required to absorb 0.05 cc. of water, and Y: the percent by weight, referring to the dry weight of the prism, of water absorbed by the prism after 24-hour immersion in water. The results were:

| Additive, in percent by weight, referred to the weight of cement | | Water adsorption | |
|---|---|---|---|
| B | Neutral zinc stearate | X (seconds) | Y (wt. percent) |
| | | 28 | 5.4 |
| 5 | | 124 | 3.9 |
| | 0.4 | 102 | 4.4 |
| 5 | 0.4 | 380 | 2.7 |
| | 0.8 | 839 | 3.1 |
| 5 | 0.8 | >1,800 | 1.4 |

Further tests indicated the addition of 5% by weight of resin B referred to the cement or the cement-based mortar to be the economic optimum. However, the amount of the resin according to the invention can vary over a broad range and depends to some extent upon the special use of the cement or mortar. A suitable range is, for example, 2.5% to 20% by weight though these limits are merely exemplary and lower or higher amounts may be used.

We claim:

1. An additive for cement-based mortars consisting essentially of 50–96% by weight of a sulfonic acid group-containing melamine-formaldehyde condensation product having a viscosity of 5–300 cp., measured in aqueous solution containing 20% by weight solids, and of 50–4% by weight metal stearate or a mixture of metal stearate and up to 50%, based on the content of metal stearate, alkali-metal aluminate.

2. The additive defined in Claim 1, wherein the metal stearate is a member selected from the group consisting of alkaline-earth metal stearates, zinc stearate, aluminum stearate and copper stearate.

3. The additive defined in Claim 1, wherein the metal stearate is calcium stearate.

4. The additive defined in Claim 1, wherein the metal stearate is zinc stearate.

5. Method of producing a water-impervious product of concrete which comprises adding to a cement-based mortar an additive as defined in Claim 1 during the mixing process.

References Cited

UNITED STATES PATENTS

| 2,611,713 | 9/1952 | Glick | 106—95 |

FOREIGN PATENTS

| 4,319,431 | 8/1968 | Japan | 106—95 |
| 263,607 | 7/1968 | Austria | 106—95 |
| 192,838 | 11/1957 | Austria | 106—95 |
| 372,967 | 12/1963 | Switzerland | 106—95 |
| 1,057,002 | 11/1967 | W. Germany | 106—95 |
| 1,185,971 | 1/1965 | W. Germany | 106—95 |

MAURICE J. WELSH, Primary Examiner

R. W. GRIFFIN, Assistant Examiner

U.S. Cl. X.R.

106—95

UNITED STATES PATENT OFFICE
CERTIFICATE OF CORRECTION

Patent No. 3,827,992          Dated August 6, 1974

Inventor(s) Alois Aignesberger et al.

It is certified that error appears in the above-identified patent and that said Letters Patent are hereby corrected as shown below:

In the Heading:

After "Claims Priority, application" replace "Great Britain...Australia, Nov. 16, 1971, 35,509/71" by --Germany, October 7, 1970, P. 20 49 158.1--.

Signed and sealed this 29th day of October 1974.

(SEAL)
Attest:

McCOY M. GIBSON JR.          C. MARSHALL DANN
Attesting Officer          Commissioner of Patents